United States Patent
Arnold et al.

(10) Patent No.: US 10,465,638 B2
(45) Date of Patent: Nov. 5, 2019

(54) INLET MANIFOLD ARRANGEMENT FOR A FOUR-STROKE COMBUSTION ENGINE

(71) Applicant: KTM AG, Mattighofen (AT)

(72) Inventors: David Arnold, Sun Valley, CA (US); Roger De Coster, Ladera Ranch, CA (US); Christian Sperz, Schalchen (AT); Marco Hubmann, Möderbrugg (AT); Michael Viertlmayr, Obertrum (AT)

(73) Assignee: KTM AG, Mattighofen (AT)

( * ) Notice: Subject to any disclaimer, the term of this patent is extended or adjusted under 35 U.S.C. 154(b) by 0 days.

(21) Appl. No.: 15/604,221

(22) Filed: May 24, 2017

(65) Prior Publication Data

US 2018/0340497 A1   Nov. 29, 2018

(51) Int. Cl.
| | |
|---|---|
| *F02M 35/10* | (2006.01) |
| *F02M 35/104* | (2006.01) |
| *F02M 35/16* | (2006.01) |
| *F16K 15/16* | (2006.01) |
| *F16K 27/02* | (2006.01) |

(52) U.S. Cl.
CPC .... *F02M 35/10255* (2013.01); *F02M 35/104* (2013.01); *F02M 35/1015* (2013.01); *F02M 35/162* (2013.01); *F16K 15/16* (2013.01); *F16K 27/0209* (2013.01)

(58) Field of Classification Search
CPC ........ F02D 41/0002; F02D 2200/0406; F02M 35/104; F02M 35/12; F02M 35/02
See application file for complete search history.

(56) References Cited

U.S. PATENT DOCUMENTS

| 4,271,802 A | * | 6/1981 | Hori | F02B 31/08 |
|---|---|---|---|---|
| | | | | 123/432 |
| 4,306,527 A | * | 12/1981 | Kinugawa | F02D 31/005 |
| | | | | 123/327 |
| 4,356,798 A | * | 11/1982 | Sakaoka | F01L 3/205 |
| | | | | 123/184.46 |

(Continued)

FOREIGN PATENT DOCUMENTS

| DE | 3024812 A1 | 1/1982 |
|---|---|---|
| DE | 68905316 T1 | 6/1993 |

(Continued)

OTHER PUBLICATIONS

KTM AG, "Super Duke GT, XC-W and EXC-F," public PowerPoint® Presentation by KTM AG to selected invitees; no earlier than Jun. 1, 2016 in Mattighofen, Austria, pp. 1-62.

*Primary Examiner* — Long T Tran
(74) *Attorney, Agent, or Firm* — Rod D. Baker

(57) ABSTRACT

An inlet manifold arrangement is disclosed for a four-stroke internal combustion engine having at least one working cylinder with inlet valves and outlet valves and an inlet manifold assembly. The inlet manifold assembly has a flow direction for fluid (such as a fuel-air mixture) in the inlet direction, and an end section near an air filter device. The manifold assembly also has a throttle valve arrangement and a non-return valve which blocks in the direction opposite to the flow direction. The non-return valve is situated, in relation to the flow direction, between the end section of the inlet manifold assembly and the throttle valve arrangement.

16 Claims, 6 Drawing Sheets

(56) References Cited

U.S. PATENT DOCUMENTS

| | | | | | |
|---|---|---|---|---|---|
| 4,399,789 | A | * | 8/1983 | Yano | F02D 31/005 123/339.11 |
| 4,528,958 | A | * | 7/1985 | Yoshida | F01L 1/44 123/184.42 |
| 4,887,577 | A | * | 12/1989 | Arai | F02D 41/187 123/494 |
| 5,179,917 | A | * | 1/1993 | Hokazono | F02B 29/02 123/184.45 |
| 5,706,654 | A | * | 1/1998 | Nagai | F02D 41/1441 123/674 |
| 5,722,358 | A | * | 3/1998 | Fuesser | B60K 13/02 123/184.56 |
| 5,769,041 | A | * | 6/1998 | Suzuki | F02B 61/02 123/198 F |
| 7,399,789 | B2 | * | 7/2008 | Pierce | C07C 237/30 514/539 |
| 2006/0048738 | A1 | * | 3/2006 | Isaji | F02B 31/06 123/184.56 |
| 2016/0040637 | A1 | * | 2/2016 | Tsubone | B62K 11/04 180/225 |
| 2016/0258347 | A1 | * | 9/2016 | Riley | F02B 33/04 |

FOREIGN PATENT DOCUMENTS

| | | |
|---|---|---|
| DE | 19857738 A1 | 7/1999 |
| EP | 0896131 B1 | 5/2003 |
| WO | 2015088347 A1 | 6/2015 |

\* cited by examiner

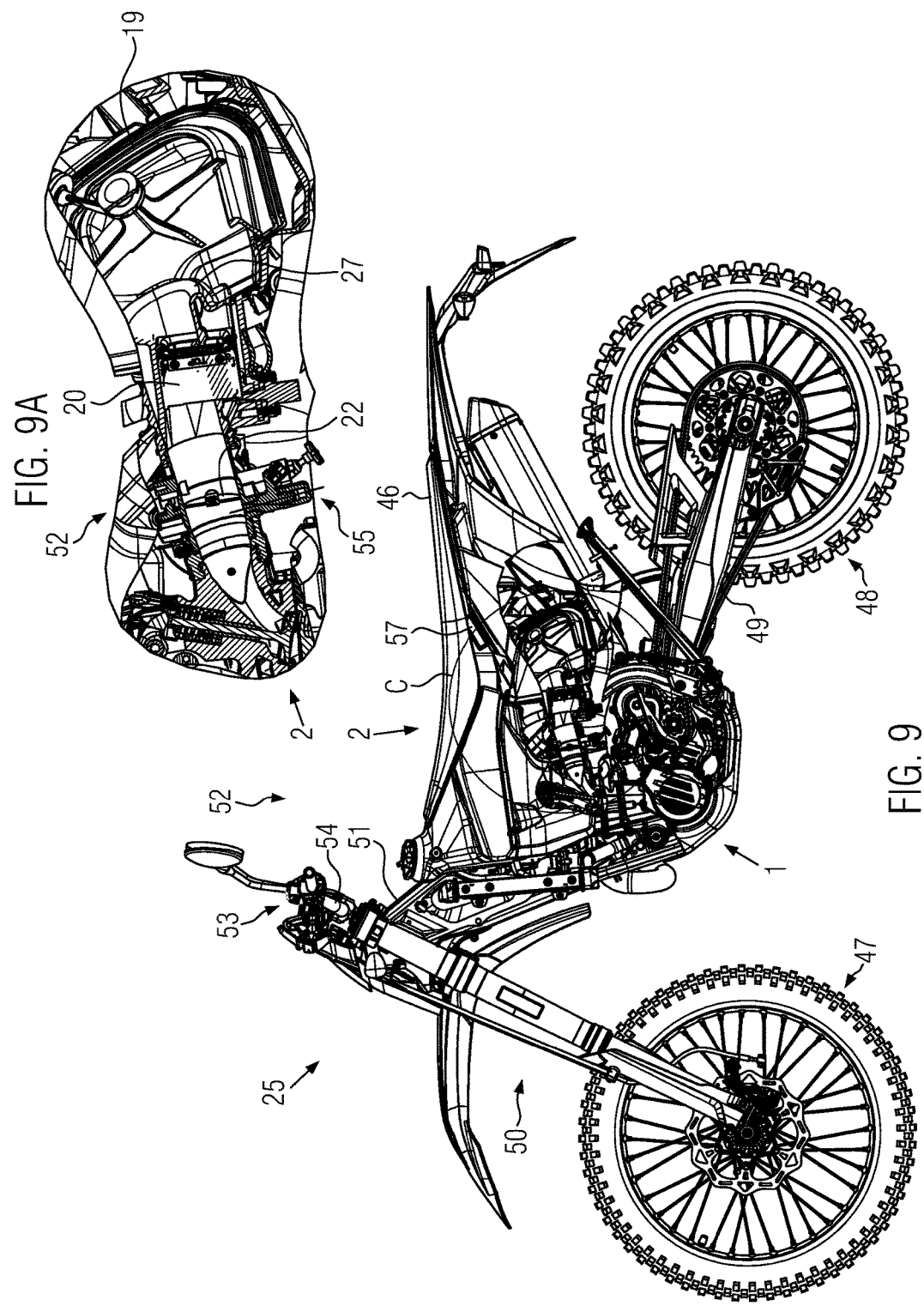

10,465,638 B2

INLET MANIFOLD ARRANGEMENT FOR A FOUR-STROKE COMBUSTION ENGINE

BACKGROUND OF THE INVENTION

Field of the Invention

The present invention relates to an inlet manifold arrangement for a four-stroke combustion engine having at least one working cylinder with inlet and outlet valves, and particularly relates to a manifold arrangement having an inlet manifold assembly which has a flow direction for fluid in the inlet direction and an end section adjacent to an air filter device.

Background of the Invention

A combustion engine usually comprises an inlet manifold arrangement with which a fuel-air mixture, or in the case of a combustion engine operated with direct fuel injection, intake air or combustion air is fed, in order to be introduced into the combustion chamber of the working cylinder through the open inlet valves.

The inlet manifold arrangement can comprise a manifold assembly which contains a plurality of manifold segments. The manifold segments can be lengths of pipe of any cross-section and diameter, extending either straight or at an angle, and which can also be designed for receiving a throttle valve body. The inlet manifold arrangement can therefore extend from an inlet point for the intake air or combustion air to the inlet valves of the combustion engine, and in the following description of the invention is to be understood as such.

The inlet point or inlet body may be an end section which is arranged in the vicinity of an air filter device for filtering the intake air of the combustion engine, so that cleaned combustion air is drawn into the inlet manifold arrangement through the end section. In the case of a combustion engine with direct injection, the air is then fed to the combustion chamber as pure intake air or combustion air, or is enriched with fuel in the course of the flow of the intake air in the direction of the combustion chamber, wherein the fuel enrichment can take place either by means of a carburetor or a throttle valve arrangement. The fuel is added, through the carburetor or throttle valve arrangement, to the intake air flow, for example via an injector nozzle, which can also be the case in the inlet manifold arrangement according to the present invention. The invention may include a four-stroke combustion engine equipped therewith, and in the motorcycle according to the invention equipped therewith.

In addition to a combustion engine that operates according to the four-stroke principle, combustion engines that operate according to the two-stroke principle have also been known, in which to improve the charge cycle in the intake area, devices known as diaphragm valves are provided.

On the basis of DE 198 57 738 A1, an example of a two-stroke combustion engine has been disclosed, which comprises a non-return valve in the intake area which is designed to prevent a flow of fresh gas from an impulse channel back into the intake channel.

On the basis of DE 689 05 316 T2 a diesel-powered two-stroke combustion engine has been disclosed, the intake region of which is fitted with a so-called reed valve, which valve is designed to prevent a flow of air back into the crank chamber during the compression stroke.

On the basis of EP 0 896 131 B1 an integral reed valve body has been disclosed, which has connections for feeding the lubrication oil for the two-stroke engine and for receiving an air regulator screw for setting the idle speed of the engine, and also features a retainer for an injection element for the fuel supply of the engine, wherein the integral reed valve body is intended to facilitate the assembly of the engine.

On the basis of WO 2015/088347 A1 a combustion engine has been disclosed, which comprises an inlet diaphragm, arranged in the direction of the fluid flow between the throttle valve and the combustion chamber of the working cylinder, i.e., downstream of the throttle valve.

And on the basis of DE 30 24 812 A1 a four-stroke engine is disclosed, having a non-return valve which includes diaphragm tongues and is arranged in the intake area between the intake valve and the throttle body, in this case a throttle valve of a carburetor. The non-return valve is thus provided, as in the above case based on WO 2015/088347 A1, downstream of the throttle valve and therefore downstream of the throttle valve arrangement.

Combustion engines are subject to ever increasing noise restriction regulations, which are relevant to their approval and have to be met, for example, in the type approval of a vehicle being approved for road transport.

The noise emission values of a vehicle are determined by, among other things, the loudness of the combustion noises of the vehicle's combustion engine that are damped by the exhaust system. The rolling noise of the tires of the vehicle also contributes to the overall noise level, and finally the intake noises of the combustion engine also form part of the overall noise pattern.

The intake noise of the combustion engine can be reduced using large-volume intake silencers in the intake area of the combustion engine, but these occupy a large amount of space which cannot be provided in the case of motorcycles, for example, for reasons related to their design. In addition, the intake noise damping is often associated with an undesirable loss of power in the combustion engine, or with a reduction of the engine torque delivered by the combustion engine in different speed ranges.

Against the foregoing background, the present invention was conceived and developed.

SUMMARY OF THE DISCLOSURE

There is disclosed hereby a combustion engine inlet manifold apparatus arrangement, which both enables a reduction of the intake noise levels of the engine, and also limits loss of power of the combustion engine, and which is additionally designed in such a way that it is suitable for use on a motorcycle in spite of the limited installation space available on a motorcycle.

An object of the apparatus is to provide a combustion engine equipped with the inlet manifold arrangement, and to provide a motorcycle equipped with the combustion engine, and a method for reducing the throttle noises of a throttle valve.

In the following disclosure, both pure combustion air and air-fuel mixture are referred to as a fluid, which moves in the flow direction to the inlet valve or inlet valves as appropriate.

BRIEF DESCRIPTION OF THE SEVERAL VIEWS OF THE DRAWING

The accompanying drawings, which are incorporated into and form a part of the specification, illustrate several embodiments of the present invention and, together with the description, serve to explain the principles of the invention. The drawings are only for the purpose of illustrating a preferred or alternative embodiments of the invention and are not to be construed as limiting the invention. In the drawings:

FIG. 9 is a partial sectional side view of a motorcycle having a combustion engine with the inlet manifold arrangement according to one embodiment of the invention, and a detail thereof; and FIG. 9A is an enlarged, detailed, view of the specific area "C" according to FIG. 9, showing the intake tract of the motorcycle with the manifold arrangement according to the present invention.

DETAILED DESCRIPTION OF PREFERRED EMBODIMENTS

Figure 1:
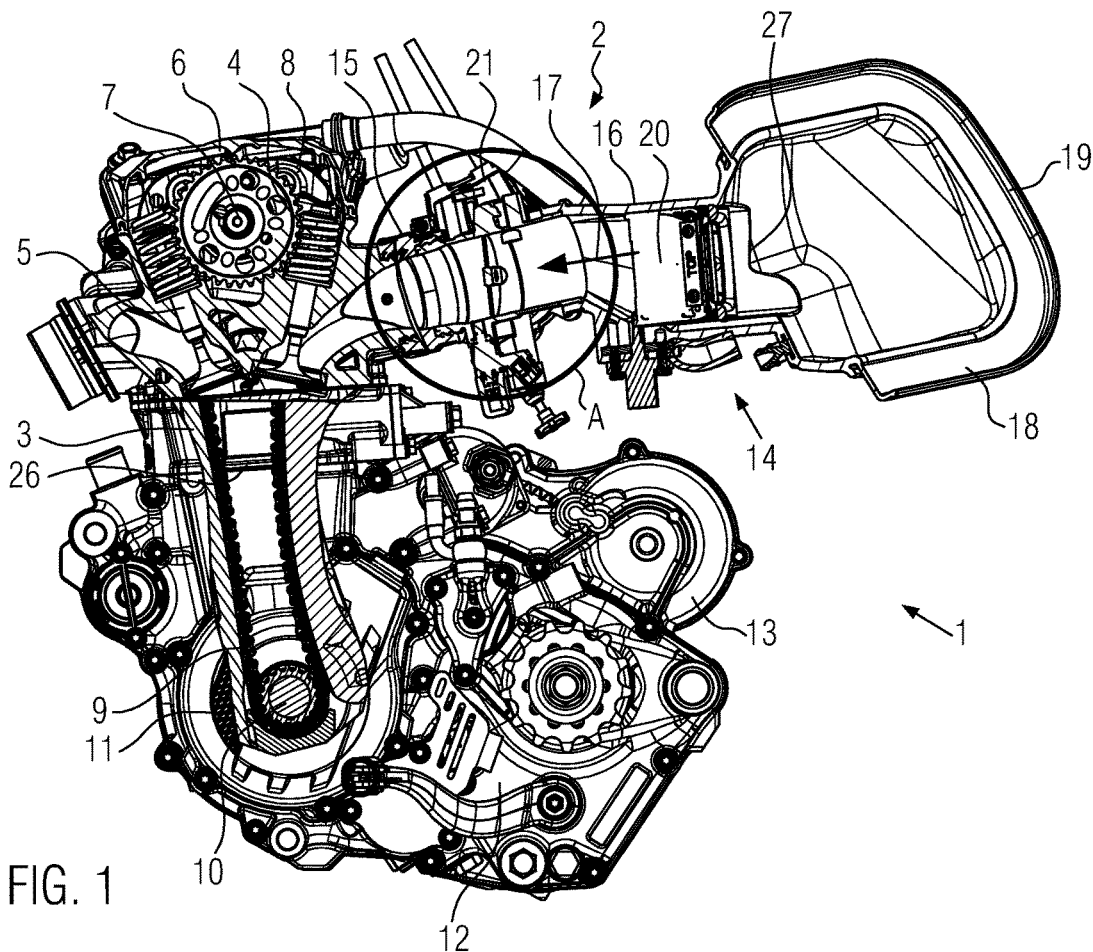
FIG. 1 is a partial sectional view of a four-stroke combustion engine with one working cylinder and an inlet manifold arrangement according to one embodiment in accordance with the present invention.

The drawing figures show a four-stroke combustion engine with an inlet manifold arrangement according to one embodiment of the presently disclosed apparatus and system. There is disclosed an apparatus with an inlet manifold arrangement for a four-stroke combustion engine having at least one working cylinder with inlet and outlet valves, and having an inlet manifold assembly which has a flow direction in the inlet direction and an end section adjacent to an air filter device. The apparatus has a throttle valve arrangement and a non-return valve which blocks in the direction opposite to the flow, wherein the non-return valve is arranged in the flow direction between the end section of the inlet manifold assembly and the throttle valve arrangement. The non-return valve thus is a sort of check valve, which prevents a backflow of fluid in a direction opposite to the flow of fluid (e.g., a fuel-air mixture) toward an inlet valve of the at least one working cylinder.

Stated differently, there is provided an inlet manifold arrangement in which the non-return valve is located in the flow direction of the fluid, i.e., the intake air and/or the air-fuel mixture, before the throttle valve arrangement, i.e., upstream of the throttle valve arrangement. This is in contrast with previously known arrangements, in which the non-return valve is located downstream of the throttle valve arrangement, that is, in the area or segment between the throttle valve arrangement and the inlet valves of the four-stroke combustion engine.

The inlet manifold assembly can comprise a plurality of components shaped like lengths of pipe, which comprise an inner passage through which the fluid can flow. The throttle valve arrangement can thus be arranged between two such pipe-shaped components, and the non-return valve is located in the direction of the fluid flow through the throttle valve arrangement, hence upstream of the throttle valve arrangement. Accordingly, the non-return valve is located on the flow path of the fluid in the direction of the inlet valves or the combustion chamber of the working cylinder, but further apart or remotely located from the combustion chamber than is the throttle valve arrangement. In the inlet flow direction, the non-return valve is located before, and therefore in fluid-mechanical terms upstream of, the throttle valve arrangement.

It has been found unexpectedly that the arrangement of the non-return valve upstream of the throttle valve arrangement, i.e., in the manifold area or zone between an air filter device and the throttle valve arrangement, for example, or between an end section of the inlet manifold assembly and the throttle valve arrangement, results in that the noise emissions of a four-stroke combustion engine are significantly lower. The noise reduction is up to approximately four decibels, compared to a four-stroke combustion engine designed without the manifold arrangement according to the present disclosure, but otherwise identically equipped, and in an identical operating cycle (which can be a test cycle, for example).

This advantage is due among other things to the fact that, in a slightly opened throttle valve of the throttle valve arrangement, high flow velocities occur in the area of the opening cross-section of the throttle valve that are associated with the development of high throttle noise; the inlet manifold arrangement according to the present system enables a significant reduction of the throttle noise emissions which propagate in the direction of the air filter device as airborne noise. The presently disclosed system and arrangement thus leads to a significant reduction of the noise emissions of the four-stroke combustion engine equipped and configured.

In the operation of an internal combustion engine, a pulsating column of gas is produced in the inlet manifold, which propagates towards the open end of the inlet manifold. This pulsating column of gas transports fuel along with it, which fuel is swept along the route towards the open end of the tube. The fuel therefore tends to wet an air filter device situated at the open end of the inlet manifold with fuel. This wetting of the air filter device with fuel can cause uncombusted hydrocarbons to be emitted by the air filter device, as well as causing the air filtration element/media of the air filter device to be wetted with fuel. In motorcycles, and in particular in the case of off-road motorcycles, the element used as an air filter is often a so-called wet air filter, which can be a foam plastic element that is wetted with a filter oil to improve the filter effect of the foam plastic element. If the pulsating gas column then transports fuel in the direction of such a wet air filter and therefore to the foam plastic element, there is a risk that the filter oil from the foam plastic element can be dispersed or washed off by the fuel, thereby impairing the filter effect of the foam plastic element.

As such off-road vehicle often are operated in dusty environments, the impairment of the filter effect of the foam plastic element allows dust, dirt or sand particles to pass through the foam plastic element and to enter the air intake area of the drive motor of the vehicle. This easily results, due to the abrasive effect of the particles carried along with the fluid, in increased wear on the engine.

Because in the present inlet manifold arrangement the air filter device is located, in fluid-mechanical terms, "upstream" of the non-return valve and a return flow of fluid in the inlet manifold arrangement in an area upstream of the non-return valve is prevented by the non-return valve, the fuel that is transported along with the pulsating gas column is prevented from reaching the region upstream of the non-return valve. The fuel thus no longer reaches the region of the air filter device or the air filter element, so that the filter oil can no longer be washed away from the wet air filter element by the back-flowing fuel-air mixture. The wet air filter element retains its filter effect and the wear on the engine is reduced.

According to an extension or further development of the present system and arrangement, it is also provided that the inlet manifold assembly includes an inlet manifold section that is designed integrally with an air filter retainer, and the non-return valve is permanently fixed in the inlet manifold section. Due to its non-detachable fixing to the inlet manifold section, the non-return valve cannot be separated from the inlet manifold arrangement without the inlet manifold section being destroyed. This protects the inlet manifold arrangement against undesirable manipulation, because the component relevant to the noise reduction—in the form of the non-return valve—cannot be removed from the inlet manifold section.

According to another aspect of the inlet manifold system according to this disclosure, the inlet manifold section can be detachably connected to the throttle valve arrangement. Thus for example if a replacement of the non-return valve is required during a service of the vehicle, the manifold section, together with the non-return valve permanently attached thereto, can be simply detached from the throttle valve arrangement and replaced by an inlet manifold section having, for example, a new non-return valve. The rapid removal of the inlet manifold section and installation of the new inlet manifold section is facilitated.

It is also provided according to another aspect of the present system that the non-return valve has at least one diaphragm valve. Due to the arrangement of the non-return valve upstream of the throttle valve arrangement, further away from the engine than the throttle valve arrangement, a comparatively low thermal and mechanical load occurs on the diaphragm valve, which means that it has a long service life. The arrangement of such a diaphragm valve remotely from the engine also results in reduced pressure peaks in the inlet manifold assembly, due to the large volume of the inlet manifold arrangement extending from the inlet valve of the working cylinder up to the non-return valve; the large volume acts as a settling chamber or settling volume, and the load on the diaphragm valve or diaphragm valves is reduced as a result of the reduction of the height of the pressure peaks. This in turn extends the service life of the non-return valve.

If, by contrast, the non-return valve is arranged—as is the case in the known arrangement—between the throttle valve arrangement and the inlet valve of the combustion engine, considerably higher pressure peaks occur and the diaphragm valve is exposed to higher loads and thus wears faster.

It also is provided that the diaphragm valve has a diaphragm retainer with at least one contact surface and at least one diaphragm tongue. The at least one tongue is detachably connectable, or connected, to the diaphragm retainer, and the tongue in a blocking state rests against the contact surface and in a non-blocking state releases an area between the contact surface and the diaphragm tongue through which fluid can flow. The diaphragm tongue can be, for example, a component similar to a small plate, which can be detachably fixed to the diaphragm retainer, for example by means of a screw connection, and thus can be easily assembled.

During the intake cycle of the combustion engine, a vacuum is generated in the inlet manifold arrangement that causes the diaphragm tongue to lift away from the contact surface, creating a region or space through which fluid can flow between the contact surface and the diaphragm tongue. The diaphragm tongue may be spring-biased in the direction of the contact surface, thus producing a closing movement of the diaphragm tongue relative to the contact surface, as soon as the inlet manifold vacuum falls below a predetermined threshold value. Consequently, any return flow occurring directly thereafter in the inlet manifold arrangement (which can be triggered, for example, by closure of the inlet valves), no longer carries fuel that can reach the air filter element.

If the combustion engine is started in the cold operating state, a cold-start enrichment is usually used, i.e., the combustion engine is operated in the cold state with a fuel-air mixture provided with excess fuel. This is also referred to as a rich fuel-air mixture. In the case of known inlet manifold arrangements, this mixture can flow back into the region of the air filter housing, where it can cause wetting of the walls. In the known manifold arrangement therefore, a fuel film is formed on the air filter housing, the breakdown of which as the engine warms up in operation can lead to transient states, to such an extent that the fuel deposited on the walls due to the heat transfer from the combustion engine to the air filter housing suddenly evaporates and is sucked into the combustion chamber, where it is not under excess air and can be combusted. As a result, the exhaust gas of the combustion engine may undesirably contain uncombusted hydrocarbons and carbon monoxide accumulations. This problem also is minimized by the present manifold system and arrangement because, as a result of its blocking effect, the non-return valve helps to prevent deposits of fuel on the walls of the housing of the air filter device.

According to another aspect of the present system, it is provided that the diaphragm retainer has a wedge-shaped configuration and comprises two contact surfaces and two diaphragm tongues, which tongues in the blocking state rest against the contact surfaces (of the diaphragm retainer) and in the non-blocking state release an area between the contact surface and the diaphragm tongue through which fluid can flow. Compared to a non-return valve with only one diaphragm retainer, this configuration beneficially enables the design of the manifold section which receives the diaphragm retainer with a smaller diameter than that which would be necessary if only one diaphragm retainer were to be used, while maintaining the same total cross-sectional area of the flow-penetrable region.

In the case of a single diaphragm retainer therefore, the manifold section would have to have a larger diameter, which in the low speed range of the combustion engine would lead to a reduction in the speed of the fluid flow in the manifold section—and thus to a reduction of the output torque delivered by the combustion engine at low rotational speeds.

According to an extension of this system and apparatus, it is also provided that at a region facing the diaphragm retainer, the inlet manifold section has, or defines, in cross section a wedge-shaped configuration with a manifold contact surface, and the diaphragm retainer is arranged on the manifold contact surface. This allows simple mounting of the inlet manifold arrangement, because the non-return valve, with its diaphragm retainer or diaphragm retainers, has only to be inserted in the inlet manifold section, where due to the centering effect of the wedge-shaped configuration of the contact surfaces of the inlet manifold section and the corresponding contact surfaces on the diaphragm retainers, it adopts or assumes a clearly defined position.

As has already been mentioned above, it is advantageous if the non-return valve comprises two diaphragm retainers each with two diaphragm tongues, because this achieves a high total surface area of the diaphragm tongues over which fluid can flow while still allowing a high flow rate in the inlet manifold arrangement at low combustion engine speeds. This means that the output torque of the combustion engine advantageously can be increased in the operating range.

The location of the non-return valve between the end section of the inlet manifold structure and the throttle valve arrangement also means that the non-return valve is positioned close to the air filter device. The non-return valve is therefore accessible for a simple visual inspection, as for the purpose of inspection the air filter element only needs to be removed from the air filter element holder, and the non-return valve with its diaphragm tongues is then visible and can be visually examined for signs of wear. In the event that the diaphragm tongues or the non-return valve need to be replaced, the inlet manifold section with the non-return valve and the air filter holder can be simply removed from the throttle valve body or the throttle valve arrangement, and replaced by a new inlet manifold section with a new non-return valve without the throttle body having to be removed from the inlet manifold arrangement.

It is also provided according to yet another feature of the present system that in the blocking state, the diaphragm tongue has a largely flat configuration, and preferably is composed of a material comprising a fiber composite material. The use of a fiber composite material for the diaphragm tongue has the advantage that, compared with a diaphragm tongue produced from a metallic material, it is considerably lighter (in terms of the mass) than a diaphragm tongue made of a metallic material. It therefore also has a significantly lower moment of inertia during the opening movement, and when it strikes the contact surface during the closing movement, exerts a lower shock impulse on the contact surface than would be the case with a diaphragm tongue made of a metallic material.

Designing the diaphragm tongue in such a way that it has a largely flat configuration in the blocking state results in the advantage that the contact surface on the diaphragm retainer, which acts as a counter-support for the diaphragm tongue, also can be designed largely flat, which simplifies the fabrication of the diaphragm retainer.

According to another aspect of the present system, it is also provided that the diaphragm tongue's fiber composite material has a matrix material in the form of, for example, a thermosetting plastic, into which carbon fibres can be integrated as reinforcement fibers. This ensures a diaphragm tongue with lower inherent mass and therefor low moment of inertia during the movement of the diaphragm tongues. It also provides the option of designing the diaphragm tongues with a low wall thickness, which therefore respond very quickly to changes in the inlet manifold vacuum.

The design of the inlet manifold arrangement according to the present system and apparatus also ensures that it can even be easily retrofitted on existing combustion engines; an after-market or add-on solution is provided.

There is disclosed hereby a four-stroke combustion engine having at least one working cylinder with inlet and outlet valves, and an inlet manifold arrangement with an inlet manifold assembly, which allows a flow of fluid in the inlet direction and has an end section adjacent or substantially proximate to an air filter device, and has a throttle valve arrangement and a non-return valve which blocks in the direction opposite to the flow, wherein the non-return valve is arranged in the flow direction between the end section of the inlet manifold assembly and the throttle valve arrangement.

The combustion engine according to this disclosure has the advantage that the inlet manifold arrangement enables the intake noise generated by the combustion machine in operation is significantly reduced compared to known manifolds of combustion engines. For example, it has been shown that this enables the applicable noise regulations in the measuring cycle for the certification of road-approved off-road racing motorbikes to be achieved without having to accept significant performance deficits of the combustion engine. Previously, compliance with noise regulations was achieved only by making significant reductions in the cross-section of the flow-capable surface of the intake tract, which led to significant performance deficits compared to a combustion engine that could be operated without cross-sectional reductions in the intake tract.

The inlet manifold arrangement according to the present system and apparatus, and the four-stroke combustion engine powered thereby, provide a solution to this problem, because the noise regulations can be satisfied while incurring only minor power deficits with respect to the peak performance of the combustion engine powered thereby; furthermore an increase in the output torque of the combustion engine is even possible in the low speed range.

According to an extension of the four-stroke combustion engine according to this disclosure, it is provided that the throttle valve arrangement includes at least one throttle valve and at least one device for injecting fuel, and that the device delivers the fuel into an area between the throttle valve and the inlet valve. The result obtained is that in fluid-mechanical terms the fuel is introduced downstream of the throttle valve, and the return flow of fuel in the direction of the non-return valve is therefore reduced.

Our arrangement also offers a motorcycle with a rider's seat and a front wheel and with a rear wheel powered by an internal combustion engine, the internal combustion engine being a four-stroke combustion engine having at least one working cylinder with inlet and outlet valves and an inlet manifold assembly, and the inlet manifold assembly having a flow direction for fluid in the inlet direction towards the inlet valves and an end section adjacent to an air filter device, and having a throttle valve arrangement and a non-return valve which blocks in the direction opposite to the flow, and the non-return valve being arranged in the flow direction between the end section of the inlet manifold assembly and the throttle valve arrangement. The non-return valve in the inlet manifold arrangement of the motorcycle according to our disclosure is therefore provided upstream of the throttle valve arrangement, and the internal combustion engine used for driving the motorcycle is a four-stroke internal combustion engine. The throttle valve arrangement includes at least one throttle valve and at least one device for injecting fuel, and the device delivers the fuel into an area between the throttle valve and the inlet valve.

The present apparatus and system facilitates a method for reducing the throttle noise of a throttle valve which is coupled to an inlet manifold assembly, and the inlet manifold assembly comprises a flow direction for fluid in a forward direction of the throttle valve and an end section spaced apart from the throttle valve, wherein the throttle noise is silenced by means of a non-return valve arranged between the end section of the inlet manifold assembly which blocks the flow opposite to the forward direction. This method enables the reduction of the throttle noise of the throttle valve, and thus also allows the intake noise of a combustion engine (which is influenced by the throttle noise of the throttle valve) to be reduced and therefore the noise emissions of the combustion engine to be reduced.

The combustion engine 1 features a working cylinder 3 with inlet valves 4 and outlet valves 5, in each case two inlet valves 4 and exhaust valves 5 being specifically provided, of which by virtue of the selected view only one of each type of valve can be seen in FIG. 1. The valves 4, 5, are actuated to open via a cam shaft 7 arranged in the cylinder head 6 of the combustion engine 1 and a valve train 8, in order to implement the gas cycle in the working cylinder 3 of combustion engine 1 with the valves open. The cam shaft 7 is actuated into rotation via a timing chain 9, which is driven via a sprocket 10 by a crankshaft 11 of the combustion engine 1. All of these features make clear that the combustion engine 1 is a four-stroke combustion engine, and therefore not a combustion engine that works according to the two-stroke principle.

The combustion engine 1 also comprises a gear-change transmission 12 and can be started using an electric starter motor 13.

The inlet manifold arrangement 2 has an inlet manifold assembly 14, which in the present system includes a rubber sleeve 15 shaped like a pipe section, and an inlet manifold section 16, so that the intake air or combustion air can flow through the manifold assembly 14 in the flow direction 17 (directional arrow in FIG. 1) in the inlet direction towards the inlet valves 4. In the area of the inlet manifold section 16 the intake air, filtered by an air filter device 18 by means of a wet air filter element 19, flows through a non-return valve 20 in the direction of a throttle valve arrangement 21. Referring to both FIG. 1 and FIG. 2, the throttle valve arrangement 21 includes an adjustable throttle valve 22, so that the flow-permeable cross-sectional area 23 (sectional area indicated by directional arrows) of the inlet manifold 24 of the throttle valve arrangement 21 can be varied by the rider of a motorcycle 25 (shown in FIG. 9), depending on the amount of power to be provided by the four-stroke engine 1 at the request of the rider.

Figures 3, 4:
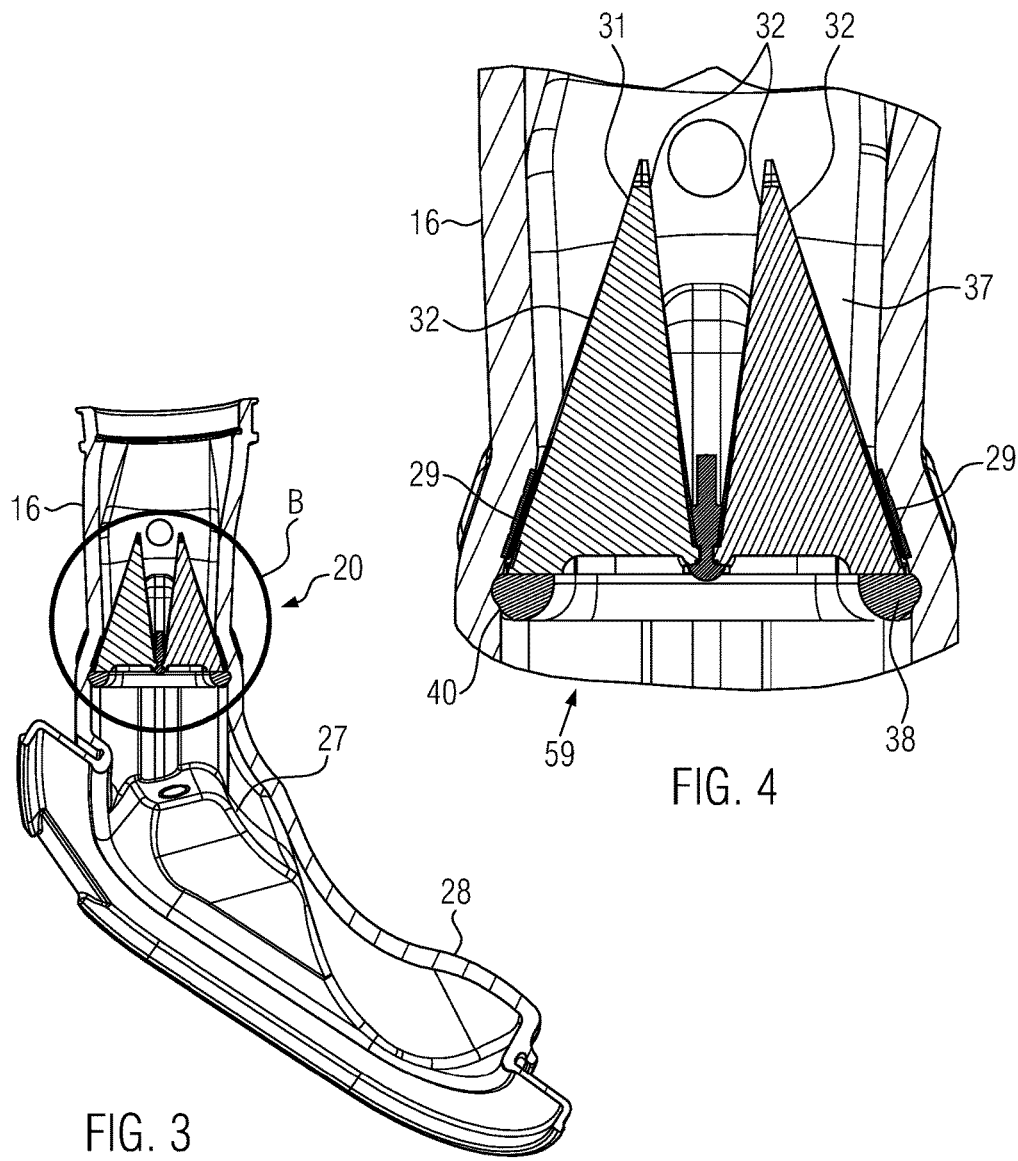
FIG. 3 is a partial sectional view of an inlet manifold section with a non-return valve.
FIG. 4 is an enlarged view of the detail "B" in FIG. 3, showing the non-return valve disposed in an inlet manifold section and a blocking position of the non-return valve.

During the intake stroke, the inlet valves 4 of the four-stroke engine 1 are in the open state and, as a result of the motion of the working piston 26, a vacuum is produced in the inlet manifold arrangement 2 which causes the non-return valve 20 to open. As seen in FIG. 1, the non-return valve 20 is arranged upstream of the throttle valve arrangement 21; in other words it is located between the throttle valve arrangement 21 and an end section 27 of the inlet manifold assembly 14, wherein the end section 27 of the manifold is located adjacent to the air filter device 18. The non-return valve 20, as is more clearly visible on the basis of FIG. 3, is arranged in the inlet manifold section 16, such that the intake air supplied via an air filter 28 must flow through the non-return valve 20. The air filter 28 can be designed, for example, as an elastomer body or plastic body and in the region of the inlet manifold section 16 has wedge-shaped contact surfaces 29, which are used for retaining the non-return valve 20.

Figure 7:
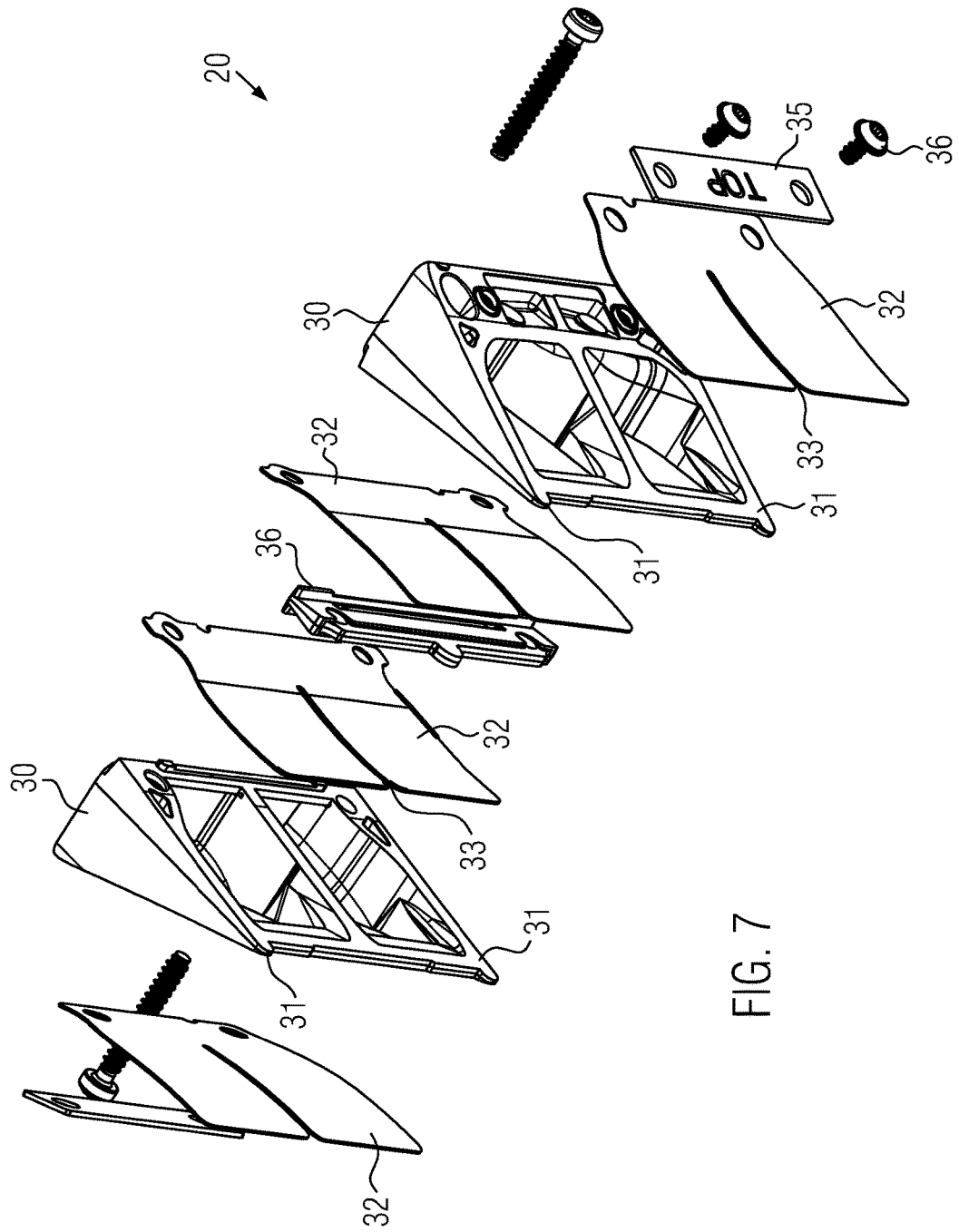
FIG. 7 is an exploded view of the non-return valve.

Referring to FIG. 7, the non-return valve 20 preferably has two wedge-shaped diaphragm retainers 30, each of which preferably has two contact surfaces 31. Diaphragm tongues 32, of which the non-return valve 20 preferably has four units, come to rest on the contact surfaces 31 when the tongues are in the closed or "blocking" condition. The diaphragm retainer 30 and the at least one diaphragm tongue 32, which can be brought in contact with the contact surface 31, together form a diaphragm valve 59. FIG. 7 also shows that the diaphragm tongues 32 are designed in the form of panels or small plates 34, partially divided by a centrally arranged slot 33, and can be fixed to the respective diaphragm retainer 30 using (for example) screws 36 and an intermediately positioned retaining plate 35. A retaining strip 36 is provided between the two diaphragm retainers 30, which strip acts as a spacer between the two diaphragm retainers 30, and also is used to fix the non-return valve in the inlet manifold 20 section 16.

Figures 5, 6:
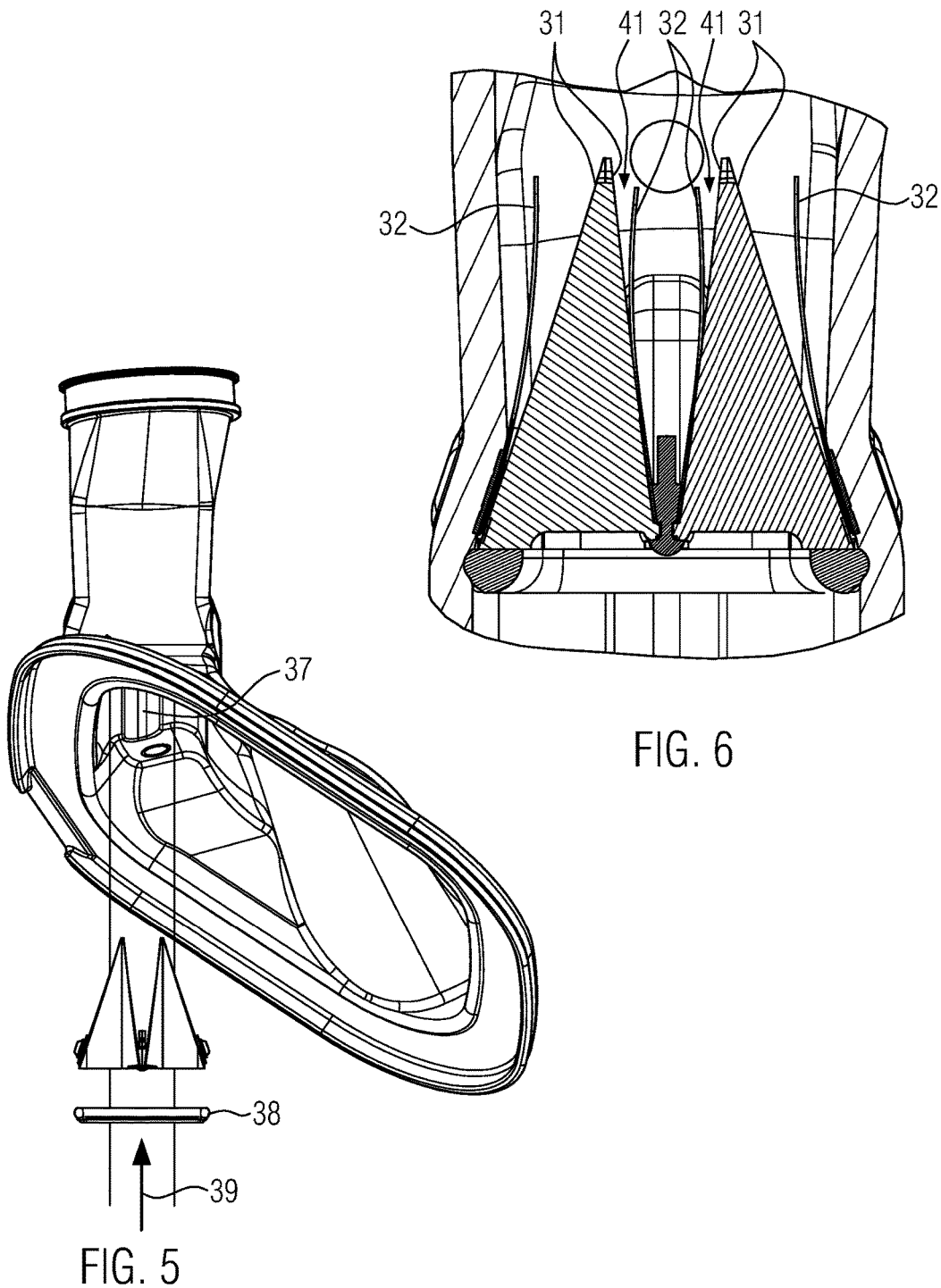
FIG. 5 is an exploded view illustrating the installation of the non-return valve in the inlet manifold section.
FIG. 6 is an enlarged view similar to that of FIG. 4, showing the non-return valve in the open state.

As shown in FIG. 5, the non-return valve 20 can be introduced into an inner recess 37 of the inlet manifold section 16 as a pre-assembled unit, and is overlapped from the insertion direction 39 (directional arrow) by a diaphragm closure part 38 (also seen in FIG. 4), which is designed for a form-fitting engagement with a groove 40 (FIG. 4) of the manifold section 16. The non-return valve 20 also preferably is permanently fixed in the inlet manifold section 16 by means of a non-soluble adhesive, so that the non-return valve 20 cannot be removed from the inlet section 16; the inlet manifold arrangement 2 thereby is rendered tamper-proof. FIG. 4 shows the diaphragm tongues 32 resting in contact with the contact surfaces 31 of the diaphragm retainers 30, and therefore defining or assuming the closed configuration of the non-return valve 20.

As mentioned above, during the intake stroke a vacuum is generated in the inlet manifold arrangement 2, which causes the non-return valve 20 to move or transfer from the closed condition to the open condition, and in the open condition a fluid flow is possible in the direction of the flow direction 17 according to FIG. 1.

FIG. 6 shows the diaphragm tongues 32 of the non-return valve 20 in the open state, in which they are lifted clear of the contact surfaces 31 to form or define a flow-permeable region 41 between the contact surfaces 31 and the diaphragm tongues. In the open state of the diaphragm tongues 32 therefore, intake air flows through the flow-permeable region 41 in the direction towards the throttle valve arrangement 21; then when the vacuum in the inlet manifold or inlet manifold arrangement 2 is reduced, i.e., the fluid flow into the combustion chamber of the working cylinder 3 comes to a halt, the diaphragm tongues 32 move from the opened state according to FIG. 6 into the closed state indicated in FIG. 4. This closed condition prevents a return flow in the inlet manifold arrangement 2, i.e., the back flow of a gas column from the closed inlet valves 4 in the direction toward the air filter device 18. This ensures that the wet air filter element 19 is not exposed to fuel that is transported along with the pulsating gas column, and therefore no filter oil is washed off the wet air filter element 19.

It has been determined that, surprisingly, the non-return valve 20 significantly reduces the intake noise of the combustion engine 1, namely by up to four decibels. For example, in a driving mode of the motorcycle 25 fitted with the inlet manifold arrangement 2 and the four-stroke combustion engine 1, a noise reduction must be successfully completed to obtain the type test and certification of the motorcycle under the "80 dB (USA) Environmental Protection Agency drive-by sound test for street legal use."

Figure 8:
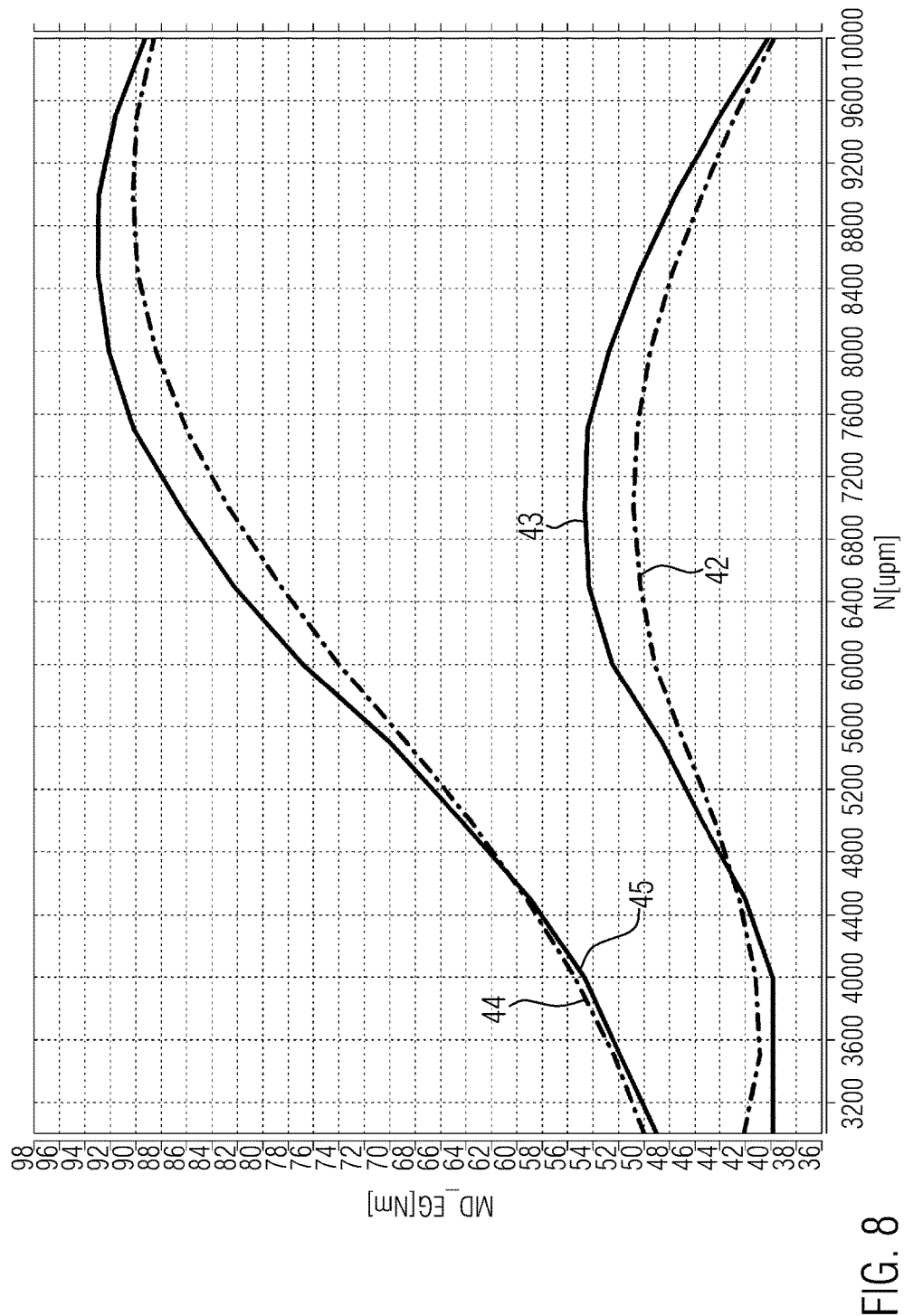
FIG. 8 is a graph of the power and the output torque (vs. rpm) of a four-stroke combustion machine having the inlet manifold arrangement according to the invention, compared to the power and output torque of a four-stroke combustion engine without the manifold arrangement according to the invention.

In a specific speed range of the four-stroke combustion engine 1, the reduction of the intake noise and thereby the sound emissions of the motorcycle 25 are even associated with an increase in the output torque delivered by the four-stroke engine 1. FIG. 8 shows a graph of the output torque and the power of the four-stroke engine 1, as comparing the inlet manifold arrangement 2 according to the present invention, and an engine without the manifold arrangement 2 according to the invention. As shown by the dash-dotted curve 42 of the output torque of the combustion engine 1 with the manifold arrangement 2 according to the present apparatus, the output torque delivered by the combustion engine 1, in the lower speed range up to around 4,700 revolutions per minute, is significantly higher than the output torque of the otherwise identical combustion engine 1 without the presently disclosed manifold arrangement 2, shown by the solid torque curve 43.

Consequently, the combustion engine with the disclosed inlet manifold arrangement 2 provides the user or rider of the motorcycle 25 with a more generous torque curve in the lower speed range than is the case with the combustion engine without the manifold arrangement 2 according to the invention. Similarly, the engine power provided by the four-stroke combustion engine 1 with the disclosed manifold arrangement 2 in the lower speed range, as shown by the dash-dotted curve 44 in FIG. 8, is higher than the engine power 45 of the otherwise identical combustion engine without the inlet manifold arrangement 2, plotted as curve 45. As the comparison of the two curves 44, 45 shows, while the maximum power of the four-stroke combustion engine 1 with the disclosed manifold arrangement 2 is slightly below the maximum power of the combustion engine without the manifold arrangement 2, the maximum power is nevertheless only slightly decreased overall.

Attention is invited to FIG. 9, showing the motorcycle 25 with the four-stroke combustion engine 1 and with the inlet manifold arrangement 2 according to the present system and apparatus. The motorcycle 25 has a rider's saddle 46 and a front wheel 47 and a rear wheel 48, which is driven by means of the four-stroke combustion engine 1 (per this disclosure) via the gear-change transmission 12 and a drive chain 49. The motorcycle 25 also has a front wheel fork 50 for controlling the front wheel 47, and a motorcycle frame 51 for supporting the above-mentioned components. The four-stroke combustion engine 1 is accommodated in the lower frame area of the motorcycle frame 51, and has an intake tract 52 for feeding in fresh gas for the four-stroke combustion engine 1 in the form of the manifold arrangement 2 according to this disclosure.

FIG. 9A shows a detail of the intake tract 52 of the four-stroke combustion engine 1 according to the present system, which is arranged on the motorcycle 25. Via a rotary activation of a throttle handle 53 arranged on a handlebar 54 (FIG. 9), the user of the motorcycle 25 can change the angular position of a throttle valve 22 arranged in a throttle valve body 55 from a closed position, corresponding to the idle position of the four-stroke combustion engine 1, into an open position, wherein the degree of opening varies the output drive power delivered by the four-stroke combustion engine 1. Varying the open position of the throttle valve 22 also changes the fuel quantity injected by means of an injection nozzle 56, wherein this is controlled via an engine control unit 57, which is arranged underneath the rider's seat 46.

Figure 2:
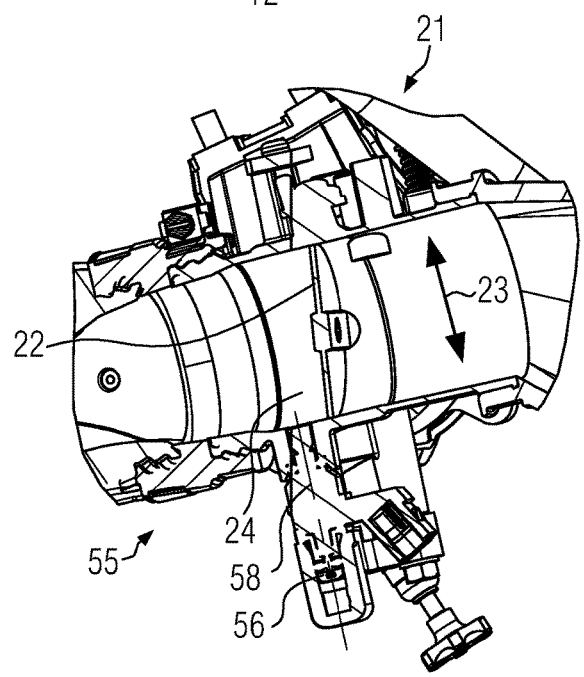
FIG. 2 is a partial sectional and enlarged view of a throttle valve device.

Line 58 in FIG. 2 of the drawing shows the injection direction, which is produced by the injection nozzle 46, that is, the direction with which the fuel jet is injected into the inlet manifold 24. As is readily apparent, the fuel jet enters the inlet manifold 24 downstream of the throttle valve 22 so that both the wetting of the throttle valve 22 with fuel, as well as the amount of fuel that can flow with the pulsating gas column towards the non-return valve 20, are reduced.

The intake air required for combustion passes through the wet air filter element 19, only shown schematically, and enters the air filter holder 28 in the filtered state, where it passes through the end section 27 of the inlet manifold arrangement 2. Later in the cycle, the non-return valve 20 is in the open position as shown in FIG. 6 of the drawing, and the intake air then passes through an idling system not shown in detail (the four-stroke combustion engine 1 is then in idling mode) or through the throttle valve 22, which is opened by a specific angle of rotation, is then enriched with fuel downstream of the throttle valve 22 via the injector 56 and then via the open inlet valves 4 reaches the combustion chamber of the working cylinder 3, where it can be burned to generate power in the working stroke of the four-stroke combustion engine 1.

If the inlet valves 4 are closed, there is a reduction of the inlet manifold vacuum, and the gas column is reflected at the closed inlet valves 4, so that a return flow of fresh gas occurs in the inlet manifold arrangement 2, but the back-flowing gas column is prevented by the non-return valve 20, now in the closed position according to FIG. 4, from flowing further back into the air filter device 18, so that the wet air filter element 19 is not exposed to the fuel. Additionally, the non-return valve 20 ensures a significant reduction of the throttle noise of the throttle valve 22, which arises even when the throttle valve 22 is only slightly open, due to the high flow velocities of the fluid prevailing in the throttle gap, and thus ensures a significant reduction of the noise emissions from the four-stroke combustion engine 1 according to this disclosure (compared with an otherwise identical four-stroke combustion engine without the manifold arrangement 2). It has been shown that the level of noise reduction is up to four decibels, so that a corresponding reduction in the noise level of the four-stroke combustion engine according to the invention and of the motorcycle equipped therewith also results.

To date, such reductions in the noise emissions in road approval-compatible motorcycles, and in particular road approval-compatible off-road racing motorbikes, could only be achieved with considerable reductions in the cross-section of the inlet manifold arrangement of known motorcycles, which often led to considerable power losses of the drive engines of the motorcycles. This problem is significantly ameliorated with the use of the inlet manifold arrangement according to this disclosure.

A four-stroke combustion engine equipped with the inlet manifold arrangement according to the invention, and a motorcycle equipped therewith, are both compatible with road approval regulations and also, because of their high power output—in spite of the significant reduction of noise emissions—still suitable for competition.

Regarding to features of the invention not described in detail individually, express reference is made to the patent claims and the drawing.

LIST OF DRAWING REFERENCE NUMERALS

1. Four-stroke combustion engine
2. Inlet manifold arrangement
3. Working cylinder
4. Inlet valve
5. Outlet valve
6. Cylinder head
7. Camshaft
8. Valve train
9. Timing chain
10. Sprocket 11. Crankshaft
12. Gear shift transmission
13. Starter motor
14. Inlet manifold assembly
15. Rubber sleeve
16. Inlet manifold section
17. Flow direction
18. Air filter device
19. Wet air filter element
20. Non-return valve
21. Throttle valve arrangement
22. Throttle valve
23. Cross-sectional area
24. Inlet manifold
25. Motorcycle
26. Working piston
27. End section
28. Air filter retainer
29. Contact surface
30. Diaphragm retainer
31. Contact surface
32. Diaphragm tongue
33. Slot
34. Plate
35. Retaining plate
36. Screws
37. Inner recess
38. Diaphragm closure part
39. Insertion direction
40. Groove
41. Flow-permeable region
42. Output torque
43. Output torque
44. Engine power
45. Engine power
46. Rider's saddle
47. Front wheel
48. Rear wheel
49. Drive chain
50. Front wheel fork
51. Motorcycle frame
52. Air intake tract
53. Throttle handle
54. Handlebar
55. Throttle valve body
56. Injection nozzle
57. Engine control unit
58. Injection direction
59. Diaphragm valve Although the invention has been described in detail with particular reference to these preferred embodiments, other embodiments may achieve the same results. In the previous description, specific details are set forth, such as specific materials, structures, chemicals, processes, etc., in order to provide a thorough understanding of the present invention. However, as one having ordinary skill in the art would recognize, the present invention can be practiced without resorting to the details specifically set forth. In other instances, well known principles of mechanics and physics have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover with the appended claims all such modifications and equivalents.

What is claimed is:

1. An inlet manifold arrangement for a four-stroke combustion engine having at least one working cylinder with inlet valves and outlet valves, and having an inlet manifold assembly which has a flow direction for fluid in an inlet direction and an end section adjacent to an air filter device, the inlet manifold arrangement having a throttle valve arrangement and a non-return valve which blocks in the direction opposite to the flow direction, said non-return valve is arranged, in the flow direction, between the end section and the throttle valve arrangement; and wherein said non-return valve comprises at least one diaphragm valve, said at least one diaphragm valve comprises at least two diaphragm retainers, and wherein each diaphragm retainer has at least two diaphragm tongues;

each said diaphragm retainer having at least one contact surface;

said diaphragm tongues being detachably connectable to a corresponding one of said at least two diaphragm retainers; and wherein each said diaphragm tongue is movable between a blocking state resting against the at least one contact surface, and a non-blocking state releasing a region through which fluid is flowable between the at least one contact surface and the at least one diaphragm tongue.

2. The inlet manifold arrangement according to claim 1, wherein the inlet manifold assembly comprises an inlet manifold section configured integrally with an air filter holder, and wherein the non-return valve is permanently fixed in the inlet manifold section.

3. The inlet manifold arrangement according to claim 2, wherein the inlet manifold section is detachably connected to the throttle valve arrangement.

4. The inlet manifold arrangement according to claim 3, wherein the non-return valve comprises at least one diaphragm valve.

5. A four-stroke combustion engine having at least one working cylinder with inlet valves and outlet valves, and further having an inlet manifold arrangement with an inlet manifold assembly, a flow direction for fluid in an inlet direction, an end section adjacent to an air filter device, a throttle valve arrangement, and a non-return valve which blocks in a direction opposite to the flow direction, said non-return valve is arranged, relative to the flow direction, between the end section of the inlet manifold assembly and the throttle valve arrangement; and wherein said non-return valve comprises at least one diaphragm valve, said at least one diaphragm valve comprises two diaphragm retainers, and wherein each diaphragm retainer has two diaphragm tongues;

each said diaphragm retainer having at least one contact surface;

said diaphragm tongues being detachably connectable to a corresponding one of said at least two diaphragm retainers; and wherein each said diaphragm tongue is movable between a blocking state resting against the at least one contact surface, and a non-blocking state releasing a region through which fluid is flowable between the at least one contact surface and the at least one diaphragm tongue.

6. The four-stroke combustion engine according to claim 5, wherein the throttle valve arrangement comprises at least one throttle valve and at least one fuel injection device, and wherein the injection device delivers fuel between the throttle valve and an inlet valve.

7. The inlet manifold arrangement according to claim 1, wherein the at least one diaphragm retainer comprises a wedge-shaped configuration and two contact surfaces, and wherein the at least one diaphragm tongue comprises two diaphragm tongues which in the blocking state rest against the contact surfaces and in the non-blocking state release a region through which fluid is flowable between the contact surfaces and the diaphragm tongues.

8. The inlet manifold arrangement according to claim 7, wherein, on a region facing the at least one diaphragm retainer, the inlet manifold section comprises:
 a wedge-shaped configuration in cross-section; and
 a manifold contact surface;
wherein the at least one diaphragm retainer is located on the manifold contact surface.

9. The inlet manifold arrangement according to claim 8, wherein the diaphragm valve comprises two diaphragm retainers and two diaphragm tongues connected to each diaphragm retainer.

10. The inlet manifold arrangement according to claim 9, wherein each of the two diaphragm tongues comprises:
 a flat configuration when in the blocking state; and
 a fiber composite material.

11. The inlet manifold arrangement according to claim 10, wherein the fiber composite material comprises:
 a matrix material; and
 reinforcing carbon fibers.

12. The inlet manifold arrangement according to claim 7, wherein the diaphragm valve comprises two diaphragm retainers and two diaphragm tongues detachably connected to each diaphragm retainer.

13. The inlet manifold arrangement according to claim 1, wherein the at least one diaphragm tongue comprises:
 a flat configuration when in the blocking state; and
 a fiber composite material.

14. A motorcycle having a rider's saddle, a front wheel, and a rear wheel driven by means of an internal combustion engine, wherein the internal combustion engine is a four-stroke combustion engine having at least one working cylinder with inlet valves and outlet valves, and an inlet manifold assembly, wherein the inlet manifold assembly comprises: a flow direction for fluid flow in an inlet direction; an end section adjacent to an air filter device; a throttle valve arrangement; and a non-return valve which blocks in the direction opposite to the flow direction; said non-return valve is arranged, in the flow direction, between the end section and the throttle valve arrangement; and
 wherein said non-return valve comprises at least one diaphragm valve, said at least one diaphragm valve comprises two diaphragm retainers, and wherein each diaphragm retainer has two diaphragm tongues;
 each said diaphragm retainer having at least one contact surface;
 said diaphragm tongues being detachably connectable to a corresponding one of said at least two diaphragm retainers; and
 wherein each said diaphragm tongue is movable between a blocking state resting against the at least one contact surface, and a non-blocking state releasing a region through which fluid is flowable between the at least one contact surface and the at least one diaphragm tongue.

15. The motorcycle according to claim 14, wherein the throttle valve arrangement comprises at least one throttle valve and at least one device for injecting fuel, and wherein the device delivers fuel into a region between the throttle valve and an inlet valve.

16. A method for reducing the throttle noise of a throttle valve coupled to an inlet manifold assembly, wherein the inlet manifold assembly comprises: a flow direction for fluid in a forward direction of the throttle valve; and an end section spaced apart from the throttle valve; the method comprising:
 silencing the throttle noise with a non-return valve; and
 arranging the non-return valve between the end section of the inlet manifold assembly and the throttle valve;
wherein the non-return valve blocks flow in a direction opposite to the forward direction.

* * * * *